United States Patent [19]
Pettit

[11] 3,738,733
[45] June 12, 1973

[54] OPTICAL DISPLAY SYSTEMS
[75] Inventor: Alexander Pettit, Rhyl, North Wales
[73] Assignee: Pilkington P.E. Limited, St. Helens, Lancashire, England
[22] Filed: Oct. 6, 1971
[21] Appl. No.: 186,907

[30] Foreign Application Priority Data
Oct. 9, 1970    Great Britain.................. 48,195/70

[52] U.S. Cl.................. 350/174, 178/7.85, 356/252
[51] Int. Cl. ............................................ G02b 27/10
[58] Field of Search .................. 350/174, 169, 55, 350/DIG. 20; 178/7.85, 7.88; 356/251–252; 353/30, 12, 13

[56]    References Cited
FOREIGN PATENTS OR APPLICATIONS
175,792    6/1961    Sweden............................. 350/174

OTHER PUBLICATIONS
IBM Technical Disclosure Bulletin pg. 144, Vol. 7, No. 2, July 1964.

*Primary Examiner*—David H. Rubin
*Attorney*—Mattern, Ware and Davis

[57]    ABSTRACT

A head-up display system having a first display apparatus including a cathode ray tube to give a main display and an optical system through which the image on the tube travels towards an observer, and a second display apparatus including a source of light and image means to provide an additional dis-play, and light-directing means to direct light from the source into the optical system so as to travel toward the cathode ray tube so that an image of the additional display is formed on the tube, whereby a stand-by display is provided which can be switched on in the event of failure of the main display. The light-directing means is positionally adjustable, whereby the position of the image of the additional display formed on the cathode ray tube is also adjustable.

9 Claims, 3 Drawing Figures

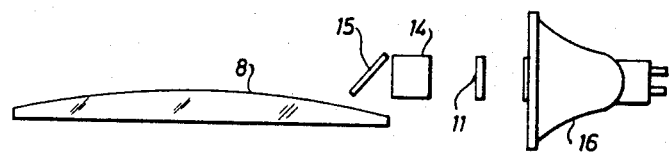
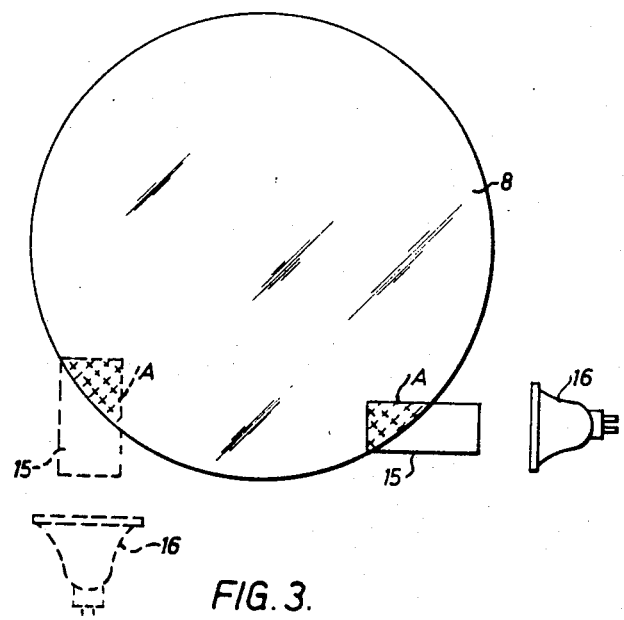

OPTICAL DISPLAY SYSTEMS

This invention concerns improvements in or relating to optical display systems, for example head-up display systems.

Head-up display systems commonly employ a cathode ray tube on which visual information can be displayed, and an optical system through which light from the cathode ray tube travels to an observer, e.g. a pilot, there usually being provided a partially reflecting combiner through which the observer views an outside scene and which reflects light from the cathode ray tube towards the observer to superimpose the display on his view of the outside scene. Normally the optical system is arranged to collimate light from the cathode ray tube so as to produce an image of the display which appears to the observer to be at infinity.

There is sometimes a requirement for a stand-by display which can be switched on in the event of failure of the main display on the cathode ray tube, e.g. through failure or malfunction of electronic components in or associated with the cathode ray tube, or which can, if desired, be used as a check for the main display. The stand-by display may be of generally simple form, e.g. a suitable graticule. One of the factors affecting the provision of a stand-by display, particularly in modern aircraft, is restricted space and weight limitations. Additionally, of course, the stand-by display should not cause excessive obscuration of the main display.

It is an object of the present invention to provide an optical display system which is particularly, but not exclusively, suitable for a head-up display system, and which can provide an improved stand-by display facility.

According to the present invention there is provided an optical display system comprising firstly main display means including a cathode ray tube with a phosphor surface to provide the main display and an optical system through which light from the cathode ray tube travels towards an observer and secondly additional display means including a source of light and image means to provide the additional display and light directing means to direct light from the light source into the optical system, so as to travel towards the cathode ray tube to form an image of the additional display on the phosphor surface of the cathode ray tube, whereby light from the image reflected from the phosphor surface can travel through the optical system towards the observer. It will be appreciated that the phosphor surface has a scattering effect on the light forming the said image so that the light from the additional display means travelling towards the phosphor surface can be confined to a very restricted angle while the image formed on the phosphor surface is, due to the scattering effect, visible from substantially any angle, whereby light reflected from the phosphor surface and carrying an image of the additional display can substantially fill the aperture of the optical system.

Preferably the optical system is arranged to collimate light from the cathode ray tube so as to produce an image of the main display which appears to the observer to be at infinity, the optical system also collimating light reflected from the phosphor surface of the cathode ray tube so as to produce an image of the additional display which also appears to the observer to be at infinity. Light leaving the optical system may travel to a partially reflecting combiner which reflects light towards the observer and through which the observer views a scene, so as to superimpose an image of the main display and/or the additional display on the observer's view of the scene.

Light from the additional display means may be directed into the optical system through an edge portion of the exit component of the optical system. Said light directing means may comprise a mirror, e.g. located adjacent an edge portion of the outer face of an exit lens component of the optical system. The light directing means may be adjustable, e.g. the said mirror may be mounted for angular adjustment, so that the position of the image of the additional display on the phosphor surface of the cathode ray tube can be adjusted.

Projector means may be associated with the additional display means and may be arranged to collimate light therefrom so that the light from the additional display means directed into the optical system is collimated. The additional display means may comprise a light source and a graticule illuminated by the light source. A condenser may be provided between the light source and the graticule or the light source may comprise an integral reflector lamp.

An existing optical display system, and in particular an existing head-up display system, can readily be fitted with an additional, e.g. stand-by, display facility in accordance with the present invention. The invention therefore includes a head-up display system comprising a cathode ray tube with a phosphor surface and an optical system including an exit component, to provide a main display characterized by the provision of additional display means including a source of light, image means and light directing means adapted to direct light from the said light source into an edge portion of the exit component of the optical system for travel towards the cathode ray tube to form an image on the phosphor surface of the cathode ray tube of a display provided by the said additional display means in such a way that only a very small part of the main display is obscured by the additional display means.

Apparatus in accordance with the invention will now be described by way of example, with reference to the accompanying drawings, in which:

FIG. 2 is a schematic view showing a modified form of part of the system of FIG. 1, FIG. 3 is a schematic plan view of the part of the system shown in FIG. 2.

Figure 1:
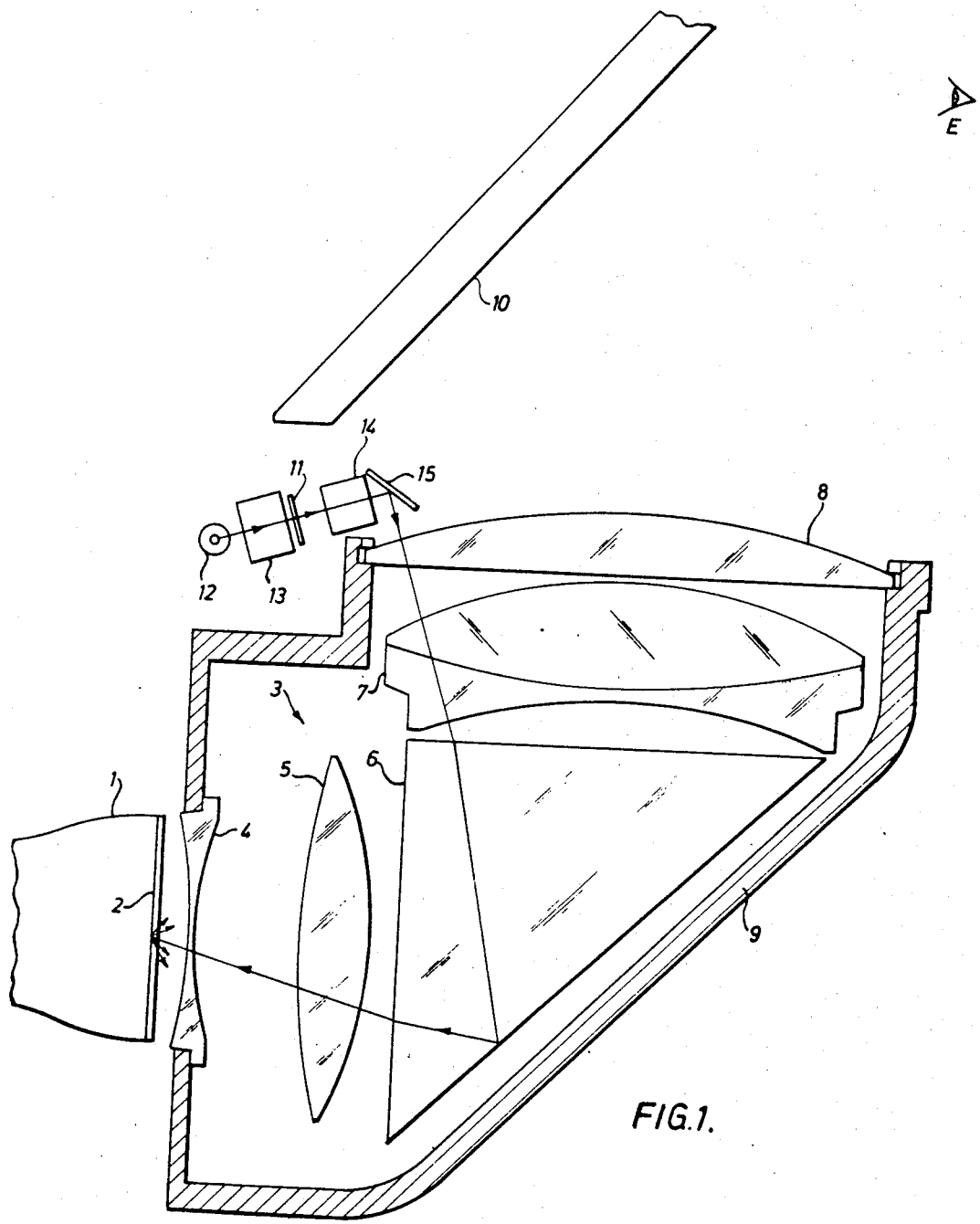
FIG. 1 is a schematic representation of a head-up display system.

The system shown in FIG. 1 comprises a cathode ray tube 1, having a phosphor surface 2, on which a main display of visual information to be communicated to the pilot of an aircraft in which the system is fitted is produced. Light from the cathode ray tube travels through an optical system, generally indicated as 3, towards the pilot. The system 3 comprises first and second lens components 4 and 5 followed by a prism element 6 having 45°, 45°, 90° corner angles and arranged as shown to move the light path through 90° by reflection from its major face. Above the prism 6 is a doublet component 7 followed by an exit lens component 8. The optical system 3 is contained in a suitable housing 9 and, in addition to bending the light path through the agency of the prism 6, is effective to collimate the light from the display on the cathode ray tube 1.

Light emerging from the exit component 8 travels towards a partially reflecting combiner plate 10 which is suitably inclined to reflect the light towards the pilot's eye E. Since the light is collimated, the pilot sees an image of the main display on the cathode ray tube 1 which appears to be at infinity and which is superimposed on his view of the outside scene through the combiner 10.

A stand-by display is provided by a graticule 11 illuminated by means of a quartz-iodine lamp 12, there being a condenser 13 between the lamp and the graticule. Light from the graticule 11 is collimated by a projector lens 14 which, in other words, images the graticule at infinity, and the light then strikes a small plane mirror 15 located adjacent an edge portion of the outer face of the exit lens component 8. This mirror is so inclined as to reflect the light into the optical system 3 through the component 8. The light travels through the optical system 3 in a direction towards the cathode ray tube 1, its path including reflection from the major face of the prism 6.

It will be seen that, since the optical system 3 is effective to collimate light from the cathode ray tube 1, and since the light directed by the mirror 15 into the optical system is collimated this latter light is focussed by the optical system 3 to form an image of the graticule 11 on the phosphor surface 2. The phosphor surface 2 reflects the light but with a scattering effect, so that the image on the phosphor surface is visible from substantially any angle even though the light incident on the phosphor surface is confined to a very restricted angle. Light reflected from the phosphor surface travels through the optical system 3, whereby it becomes collimated, and is incident on the combiner 10 for reflection therefrom to the pilot's eye E. The pilot can thus see an image of the graticule 11 which appears to be at infinity and is superimposed on his view of the outside scene through the combiner 10. It will be appreciated that, due to the scattering effect of the phosphor surface 2, light reflected therefrom and carrying an image of the stand-by display graticule 11 fills the aperture of the optical system 3.

Preferably the inclination of the mirror 15 is adjustable so that the position of the image of the graticule 11 formed on the phosphor 2 can be adjusted. Thus the mirror 15 is preferably mounted for angular adjustment about an axis perpendicular to the plane of FIG. 1.

FIG. 2 illustrates an alternative form of light source for the stand-by display. Thus, FIG. 2 shows the mirror 15, the projector lens 14, and the graticule 11 in essentially similar positions relative to the exit lens component 8 as in FIG. 1, but in the FIG. 2 embodiment the graticule 11 is illuminated by means of an integral reflector lamp 16.

It will be seen that in the embodiments described above only a very small part of the main display will be obscured by the stand-by display provision. The degree of obscuration is diagrammatically shown in FIG. 3 in which the cross-hatched area A represents the area of the exit lens component 8 which is obscured by the mirror 15 and possibly by part of the projector lens 14.

It will be appreciated that the position of the stand-by display equipment round the exit lens component 8 can be selected to suit particular requirements, and in particular to accord with available space limitations. This is diagrammatically illustrated in FIG. 3 which shows stand-by display equipment in full line in one position and in broken line in an alternative position.

The power or brightness of the stand-by display light source, in particular the quartz-iodine lamp 12 or the integral reflector lamp 16, is suitably chosen to provide a stand-by display image of the required brightness. It can be shown that the brightness B of the stand-by display image viewed by the pilot is given by:

$$B = (t\,\pi/4) \cdot (1/1+m)\,2 \cdot (B_L)/(f.\text{No})^2$$

where
$t$ is the system transmission,
$m$ is the linear magnification,
$B_L$ is the lamp brightness,
$f.\text{No}$. is the $f.\text{No}$ of the projector lens.
The system transmission $t$ is given by:
$t =$ (lens, i.e., optical system 3, transmission)$^2 \times$ combiner reflectivity $\times$ phosphor reflection.
For example, $t$ may be:

$$(0.85)^2 \times 0.25 \times 0.4 = 0.072$$

The lamp brightness $B_L$ may, for example, be $1 \times 10^7$ ft.L. and the $f.\text{No}$ of the projector lens may, for example, be 1.4. With these values the image brightness B is given by:

$$B = 0.072 \cdot \pi/4 \cdot (1/1 + m)\,2 \cdot (1 \times 10^7/1.96)$$

$$= (0.029/1 + m)\,2 \times 10^7$$

The magnification $m$ is the ratio of the focal length of the optical system 3 to the focal length of the projector lens 14. With an $m$ value of, for example, 10, the image brightness B would therefore be about 2400 ft.L. As a further example, with an $m$ value of 20 the image brightness B would be about 660 ft.L.

It will be understood that the above image brightness figures, which are given solely by way of illustration and example, apply where no dichroic is included in the system. If a dichroic which is effective to halve the amount of visible light in the image is employed, e.g. to provide a yellow/orange or a blue/green display, then the above given values would be halved correspondingly.

It will be appreciated that the above described embodiments provide a very compact stand-by display facility, and further that, if desired, the stand-by display facility can readily be added to an existing main display system.

It will be further appreciated that, whereas the mirror 15 is described above as being capable of angular adjustment, if desired the standby unit comprising the components 11, 12, 13, 14 and 15 may be angularly adjustable as a whole, and further that if desired the individual components may be mounted so as to be capable of independent adjustment.

It will be appreciated further that the graticule described above is one example of image means for the additional display. The additional display may take a different form, and in particular may comprise a map display which can be viewed by an observer simultaneously with a navigational display provided by the cathode ray tube 1.

What we claim is:

1. An optical display system comprising firstly main display means including a cathode ray tube with a phosphor surface to provide the main display and a collimating optical system including at least an exit lens component through which light from the cathode ray tube travels towards an observer and secondly additional display means including a source of light and image means to provide the additional display and light directing means including collimating projection means to direct light from the light source into the optical system so as to travel through said exit lens component towards the cathode ray tube to form an image of the additional display on the phosphor surface of the cathode ray tube, whereby light from the image reflected from the phosphor surface can travel through the optical system towards the observer.

2. An optical display system according to claim 1 wherein the main display means is arranged as a head-up display system and the additional display means is arranged as a stand-by display system.

3. An optical display system according to claim 1 wherein light leaving the optical system travels to a partially reflecting combiner which reflects light towards the observer and through which the observer views a scene, so as to superimpose an image of the main display and/or the additional display on the observers view of the scene.

4. An optical display system according to claim 1 wherein the light directing means directs light from the additional display through an edge portion of the exit lens into the optical system.

5. An optical display system according to claim 4 wherein the light directing means comprises a mirror located adjacent to the edge portion of the outer face of the exit lens component.

6. An optical display system according to claim 5 wherein the light directing means is adjustable by mounting the mirror for angular adjustment so that the image of the additional display on the phosphor surface of the cathode ray tube can be adjusted.

7. An optical display system according to claim 1 wherein the additional display means comprises as the image means a graticule which is illuminated by the light source.

8. An optical display system according to claim 1 wherein the light source comprises an integral reflector lamp.

9. A head-up display system comprising a cathode ray tube with a phosphor surface and a collimating optical system including an exit component, to provide a main display characterized by the provision of additional display means including a source of light, image means, collimating projection means, and light directing means adapted to direct light from the said light source into an edge portion of the exit component of the optical system for travel towards the cathode ray tube to form an image on the phosphor surface of the cathode ray tube of a display provided by the said additional display means in such a way that only a very small part of the main display is obscured by the additional display means.

* * * * *